United States Patent [19]

Best

[11] Patent Number: 4,548,177
[45] Date of Patent: Oct. 22, 1985

[54] GOVERNOR SYSTEM

[75] Inventor: Christopher H. Best, Ashford, England

[73] Assignee: Lucas Industries Limited, Birmingham, England

[21] Appl. No.: 528,428

[22] Filed: Sep. 1, 1983

[30] Foreign Application Priority Data

Feb. 8, 1980 [GB] United Kingdom ............... 8004236

[51] Int. Cl.⁴ .......................................... F02M 39/00
[52] U.S. Cl. ..................................... 123/357; 123/358
[58] Field of Search ......... 123/357, 358, 359, 385–387

[56] References Cited

U.S. PATENT DOCUMENTS

| 3,407,793 | 10/1968 | Lang | 123/357 |
| 3,425,401 | 2/1969 | Lang | 123/357 |
| 3,898,969 | 8/1975 | Williams | 123/357 |
| 3,973,537 | 8/1976 | Williams | 123/357 |
| 3,973,538 | 8/1976 | Williams | 123/357 |

FOREIGN PATENT DOCUMENTS 2090329 7/1982 United Kingdom ............... 123/357

Primary Examiner—Carl Stuart Miller

[57] ABSTRACT

A governor system for the fuel pump of a road vehicle includes a governor of the all-speed type and means is provided to vary the characteristic of the governor in the intermediate speed range in accordance with the load on the vehicle.

2 Claims, 3 Drawing Figures

GOVERNOR SYSTEM

This is a continuation of application Ser. No. 224,494, filed Jan. 13, 1981, now abandoned.

This invention relates to a governor system for the fuel pump of an internal combustion engine which in use powers a road vehicle. For a road vehicle for example, the power unit of an articulated vehicle, it is the usual practice to provide an all-speed governor system since the type of characteristic provided by such a governor system is ideal for when the vehicle is loaded. In an all speed governor system the driver of the vehicle selects by way of the foot pedal, the required speed and the governor system adjusts the fuel pump control so that so far as is possible, the selected speed is maintained. While the governor system may respond quickly to any change in the selected speed, the fact that the vehicle is loaded means that the change of vehicle speed will be at a much slower rate.

If the power unit is not connected to the trailer of the vehicle, then because of the much higher power to weight ratio the power unit becomes very difficult to control since even slight changes in the setting of the control pedal will cause rapid changes in the speed of the power unit.

It is known to employ two speed governor systems in such vehicles. Such a governor system controls the maximum and idling speeds of the engine but intermediate these speeds the amount of fuel supplied to the engine is determined by the setting of the control pedal of the vehicle. This form of system makes it much easier for the driver to control the power unit but demands more effort on the part of the driver when the power unit is coupled to a loaded trailer. Since the vehicle is usually driven in the loaded state, it is the usual practice to employ an all-speed governor.

The object of the present invention is to provide an all-speed governor system in a simple and convenient form. According to the invention a governor system for the fuel pump of a road vehicle has an all-speed characteristic and means is provided to adjust the response of the governor system in the intermediate speed range, said means in use, being responsive to a signal dependent upon the load on the vehicle.

An example of a governor system in accordance with the invention will now be described with reference to the accompanying drawings in which.

Figure 1:
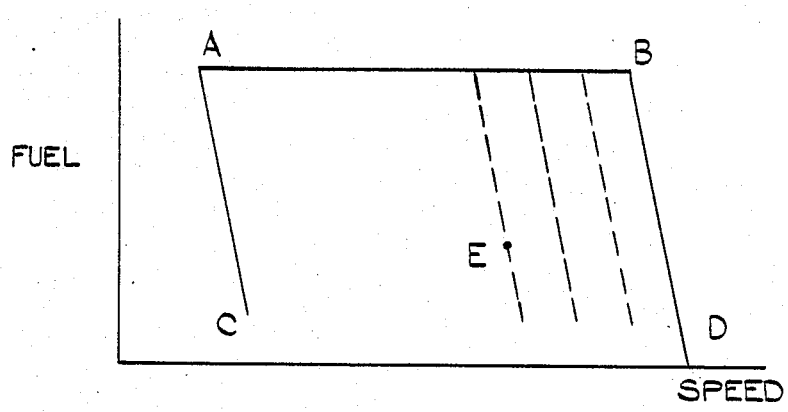
FIG. 1 shows the governor characteristic of an all-speed governor.

Referring to FIG. 1 of the drawings there is shown the characteristic of an all-speed governor with fuel being plotted against engine speed. The line AB represents the maximum fuel line which during normal operation of the engine, it is not possible to exceed. The line CA represents the idle pull-off curve, the normal idling speed of the engine being that corresponding to the point C. The line BD represents the maximum speed pull-off curve, the point D corresponding to the maximum permitted engine speed. The lines which are shown in dotted outline and which lie between the lines AC and BD, represent different levels of demand. These different levels will be obtained in the case where the governor is associated with a fuel pump which drives a vehicle engine, by different settings of the driver operable control pedal. If for example the engine is operating at point E, then if the engine speed decreases as for example when the vehicle starts to climb a hill, the point E will move up the line on which it is located and there will be an increase in the amount of fuel supplied to the engine and also a slight reduction in the engine speed. If for example the hill is extremely steep and then the point E can then reach the line AB which is the maximum fuel line, thereafter the rate of fuel flow to the engine cannot be increased and unless the driver selects a new gear ratio, the engine speed will continue to fall until it stalls.

Again considering the point E if the driver increases the demand and moves for example to a position represented by the adjacent line then the amount of fuel supplied to the engine will temporarily increase to the maximum value. The engine therefore delivers its maximum power at that speed and as the speed increases, maximum fuel will continue to be supplied to the engine until a point is reached on the line AB which corresponds to the next dotted line. Thereafter the working point will move down the dotted line until an equilibrium position is established at the new speed. The demand lines are steep but when the vehicle is loaded this does not matter. The governor will respond quickly to a fall in the engine speed and the engine will quickly receive an increased quantity of fuel however, due to the load on the vehicle the gain in engine speed will be at a comparatively slow rate and the vehicle will be comparatively easy to drive from the point of view of controlling the control pedal. If however, the vehicle is unladen as for example in the case where the trailer of an articulated vehicle is removed and the power unit is driven on its own, since the power to weight ratio will be very much higher, the engine speed will quickly increase making it very difficult to control the speed of the vehicle.

Figure 2:
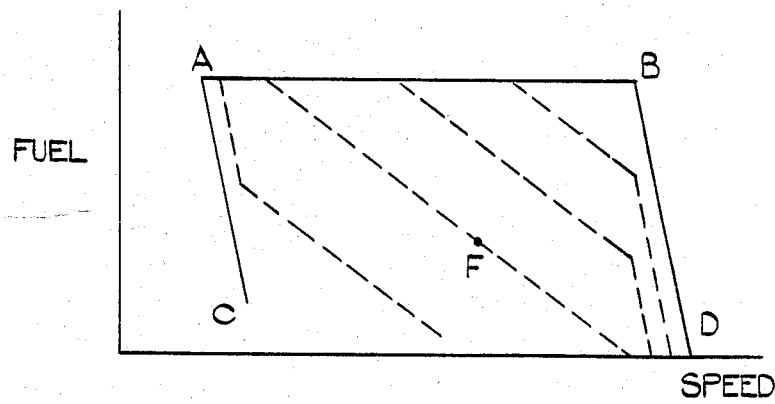
FIG. 2 shows the governor characteristic of an all-speed governor as modified in accordance with the invention.

If we now turn to FIG. 2 it will be seen that the overall envelope of the characteristic is the same as in FIG. 1. It will be noted however that the lines in the intermediate speed range now have a less steep slope. Considering the working point F, as the engine speed falls there will be a less rapid rise in the rate of fuel supply to the engine. If the demand made by the driver is increased then unless it is a substantial increase in the demand, the fuel level will not attain the maximum value as indicated by the line AB. Therefore with the modified governor characteristics, the power unit becomes much easier to control.

Figure 3:
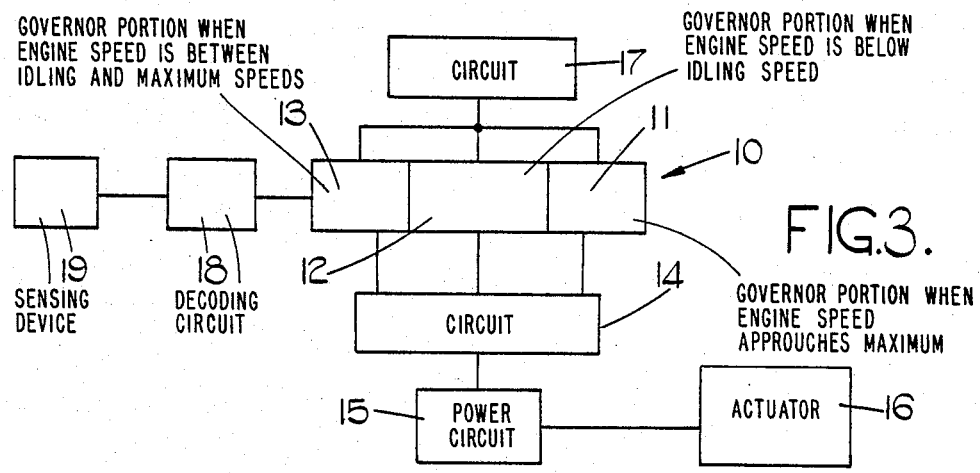
FIG. 3 shows a block diagram of the governor system in accordance with the invention.

Turning now to FIG. 3 the governor is generally indicated at 10 and it is divided into three portions 11, 12 and 13. The portion 11 of the governor takes care of the control of the fuel flow to the engine as the engine is approaching the maximum speed, that is to say any speed above the speed corresponding to the point B. The portion 12 of the governor takes care of the control of the fuel supply to the engine when the engine speed is below idling speed, i.e. point C. It will be noted that in both these regions the slope of the characteristics is steep, corresponding substantially to the slopes in FIG. 1.

The portion 13 of the governor takes care of the intermediate speed range, namely that lying between the speeds corresponding to the points C and B. The outputs from the three portions of the governor circuit are supplied to a circuit 14 which combines the outputs and supplies a power circuit 15 which in turn controls the operation of an actuator 16 connected to the fuel control rod of the fuel injection pump.

Each of the portions of the governor circuit are provided with signals representing the actual speed and the demanded speed by means of a circuit 17 which receives amongst other things, a signal representing the actual engine speed and a signal representing the demanded engine speed.

In order to modify the governor characteristic of the governor portion 13, an input signal is supplied to the portion 13 which influences the gain of circuits embodied in the portion 13 of the governor circuit. The signal is provided by a decoding circuit 18 which in turn receives a signal from a sensing device 19. This may be a switch which provides a simple on off signal depending on whether the trailer is connected or not. Alternatively, the device 19 may be a transducer which is able to provide a varying signal depending upon the magnitude of the load carried by the trailer.

I claim:

1. An all speed governor system for the fuel pump of a road vehicle comprising first fuel pump control means for controlling the fuel pump according to a first fuel-engine speed relationship in an intermediate speed range and second fuel pump control means for controlling the fuel pump according to a second fuel-engine speed relationship in the intermediate speed range, said second fuel engine speed relationship being less sensitive to changes in engine speed then said first fuel-engine speed relationship whereby changes in fuel delivery to the fuel pump change engine speed according to said second fuel engine speed relationship less than those same changes in fuel delivery to the fuel pump will change engine speed according to said first fuel-engine speed relationship, and switching means for selecting either said first fuel pump control means or said second fuel pump control means according to whether an external load is connected to the road vehicle for changing the sensitivity of fuel-engine speed relationship for any given engine speed based on whether or not the road vehicle is hauling an external load whereby for any chosen engine speed said second fuel control means can be used when no external load is connected to the road vehicle to make the road vehicle easier to control than it would be if said first fuel pump control means were used, said switching means being operable independent of engine speed.

2. A governor system for the fuel pump of an engine of a road vehicle as defined in claim 1, wherein said governor system includes first, second and third portions, said first portion acting to determine the fuel delivered by the pump in an engine speed range lying between a first predetermined speed and the maximum speed of the engine, the second portion acting to determine the fuel delivered by the pump in an idling speed range of the engine, the third portion acting to determine the fuel delivered by the pump in an intermediate speed range lying between the idling speed range and said first predetermined speed, said load sensing means providing a signal to said third portion to modify the response thereof.

* * * * *